(12) United States Patent
Shen et al.

(10) Patent No.: US 11,335,982 B2
(45) Date of Patent: May 17, 2022

(54) BATTERY MODULE

(71) Applicant: BYD COMPANY LIMITED, Guangdong (CN)

(72) Inventors: Xi Shen, Shenzhen (CN); Zhipei Lu, Shenzhen (CN); Weixin Zheng, Shenzhen (CN); Jia Lu, Shenzhen (CN); Jing Tan, Shenzhen (CN); Yan Zhu, Shenzhen (CN); Jianhua Zhu, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 117 days.

(21) Appl. No.: 16/627,652

(22) PCT Filed: Jun. 25, 2018

(86) PCT No.: PCT/CN2018/092602
§ 371 (c)(1),
(2) Date: Dec. 30, 2019

(87) PCT Pub. No.: WO2019/001384
PCT Pub. Date: Jan. 3, 2019

(65) Prior Publication Data
US 2021/0159576 A1 May 27, 2021

(30) Foreign Application Priority Data
Jun. 30, 2017 (CN) .......................... 201710524950.8

(51) Int. Cl.
*H01M 50/593* (2021.01)
*H01M 50/209* (2021.01)
(Continued)

(52) U.S. Cl.
CPC ....... *H01M 50/593* (2021.01); *H01M 50/209* (2021.01); *H01M 10/658* (2015.04);
(Continued)

(58) Field of Classification Search
CPC .. H01M 50/593; H01M 50/20; H01M 10/658; H01M 10/6555; H01M 50/209; Y02E 60/10
(Continued)

(56) References Cited

U.S. PATENT DOCUMENTS

2011/0195291 A1* 8/2011 Yokoyama ............ H01M 50/24
429/99
2012/0045686 A1* 2/2012 Jung ..................... H01M 50/20
429/159
(Continued)

FOREIGN PATENT DOCUMENTS

CN    104752649 A    7/2015
CN    106450406 A    2/2017
(Continued)

OTHER PUBLICATIONS

English Translation of International Search Report from PCT/CN2018/092602 dated Sep. 27, 2018 (2 pages).

*Primary Examiner* — Jonathan G Jelsma
*Assistant Examiner* — Omar M Kekia

(57) ABSTRACT

A battery unit includes a battery and an insulation film, the battery includes a battery housing, a battery core disposed inside the battery housing, and a battery cover plate disposed on an end portion of the battery housing; the insulation film is coated on at least one side face of the battery housing, the insulation films on two adjacent battery units are bonded to each other in the preset direction to connect the plurality of battery units together; and the insulation film includes an extension portion, where the extension portion is formed by a top portion of the insulation film which protrudes from the battery cover plate and extends upward, the top plate is disposed on an upper side of the battery unit, a groove is
(Continued)

provided on a lower side of the top panel, and at least part of the extension portion is accommodated in the groove.

20 Claims, 4 Drawing Sheets

(51) Int. Cl.
*H01M 50/20* (2021.01)
*H01M 10/6555* (2014.01)
*H01M 10/658* (2014.01)

(52) U.S. Cl.
CPC ........ *H01M 10/6555* (2015.04); *H01M 50/20* (2021.01); *Y02E 60/10* (2013.01)

(58) Field of Classification Search
USPC .......................................................... 429/99
See application file for complete search history.

(56) References Cited

U.S. PATENT DOCUMENTS

| | | | |
|---|---|---|---|
| 2014/0220415 A1 | 8/2014 | Lim | |
| 2014/0315070 A1* | 10/2014 | Park | H01M 50/20 |
| | | | 429/151 |
| 2018/0175468 A1* | 6/2018 | Shin | H01M 10/6556 |

FOREIGN PATENT DOCUMENTS

| | | | |
|---|---|---|---|
| JP | 2013251241 A | 12/2013 | |
| JP | 2016058260 A | 4/2016 | |
| KR | 20140124720 A | 10/2014 | |
| KR | 20170039948 A | 4/2017 | |

\* cited by examiner

BATTERY MODULE

CROSS-REFERENCE TO RELATED APPLICATIONS

This application is based on International Application No. PCT/CN2018/092602, filed on Jun. 25, 2018, which claims priority to and benefits of Chinese Patent Application Serial No. 201710524950.8, entitled "BATTERY MODULE" and filed with the State Intellectual Property Office of P. R. China on Jun. 30, 2017. The entire contents of the above-referenced applications are incorporated herein by reference.

FIELD

The disclosure belongs to the field of power battery technologies, and more particularly to a battery module.

BACKGROUND

Improving a battery energy density is an important aspect of current power battery design, and conventional methods for increasing the energy density includes two main aspects. In one aspect, a material is replaced and modified so that a material with a higher density is used. In the other aspect, battery structure and strategy are designed so that the same battery module obtains a higher energy density. Improving the battery energy density through materials has always been the focus of research and development of various companies, for example, replacing lithium iron phosphate with ternary materials. If the design of the battery structure is changed to obtain a higher energy density, the usual method is weight reduction and compacting, and especially, the weight reduction achieves the best effect. However, current weight reduction methods are mostly implemented by reducing (or removing) parts of structural members or reducing the material thickness of the structural members. Although the method reduces the weight of a battery pack to some extent, the strength of the battery pack is decreased, which reduces the safety performance of the battery pack. How to reduce the structural members while maintaining good mechanical strength and electrical safety of the battery module is also the current focus of continuous research by various companies.

SUMMARY

The technical problem to be solved by the present disclosure is to provide a battery module to solve the problem that battery pack strength and safety performance are decreased because in an existing battery module, weight reduction of the battery module is implemented by reducing (or removing) parts of structural members or reducing the material thickness of the structural members. To resolve the foregoing technical problem, embodiments of the present disclosure provide a battery module, including a plurality of battery units stacked along a preset direction and a top panel, where the battery unit includes a battery and an insulation film; the battery includes a battery housing, a battery core disposed inside the battery housing, and a battery cover plate disposed on an end portion of the battery housing; the insulation film is coated on at least one side face of the battery housing; the insulation films on two adjacent battery units are bonded to each other in the preset direction to connect the plurality of battery units together; and the insulation film includes an extension portion, where the extension portion is formed by a top portion of the insulation film which protrudes from the battery cover plate and extends upward, the top plate is disposed on an upper side of the battery unit, a groove is provided on a lower side of the top panel, and at least part of the extension portion is accommodated in the groove.

In some embodiments, a plurality of supporting blocks is disposed on a bottom portion of the top panel.

In some embodiments, the groove is formed on the supporting block.

In some embodiments, the supporting block extends from a bottom portion of the top plate towards the battery cover plate, and the supporting block is supported on the battery cover plate. Optionally, the insulation film is coated on the side face of the battery housing, and an insulation baseplate is disposed on a bottom face of the battery housing. Optionally, the side face of the battery housing includes large faces and small faces, where the large faces include a first large face and a second large face, and the small faces include a first small face and a second small face. The first large face, the first small face, the second large face, and the second small face are successively connected to form the side face of the battery housing, and an area of the large face is greater than an area of the small face; the first large face and the second large face are disposed opposite to each other, and the first small face and the second small face are disposed opposite to each other.

In some embodiments, a first back adhesive layer is disposed between the insulation film and the side face of the battery housing, and the insulation film is bonded to the side face of the battery housing through the first back adhesive layer. Optionally, a second back adhesive layer is disposed on an outer side of the insulation film between two adjacent battery units, and the two adjacent battery units are bonded to each other through the second back adhesive layer. Optionally, a seal of the insulation film is located on the first small face and/or the second small face.

In some embodiments, a double-film structure is formed on the seal of the insulation film, and a width k of the double-film structure meets the following requirements: $2x \geq 3k \geq x$, wherein x is a width of the first small face or the second small face. Optionally, the battery module further includes a first end plate, a second end plate, a first elastic component, and a second elastic component, where the first end plate is disposed on a front end of the first battery unit in the preset direction, the second end plate is disposed on a rear end of the last battery unit in the preset direction, the first elastic component is prepressed between the first end plate and the first battery unit, and the second elastic component is prepressed between the second end plate and the last battery unit.

In some embodiments, the first battery unit is provided with a first driver plate on a surface facing the first end plate, and the first elastic component is disposed between the first driver plate and the first end plate; the last battery unit is provided with a second driver plate on a surface facing the second end plate, and the second elastic component is disposed between the second driver plate and the second end plate. Optionally, the first elastic component and the second elastic component are metal elastic pieces or springs.

In the battery module according to the embodiments of the present disclosure, structural members that act as connectors in the prior art are removed, the insulation films on two adjacent battery units are bonded to each other in the preset direction to connect the plurality of battery units together, thereby realizing weight reduction of the battery module without decreasing the strength of the battery module. In addition, the extension portion is formed by the top portion of the insulation film which protrudes from the battery cover plate and extends upward, and at least part of the extension portion is accommodated in the groove provided on the lower side of the top panel, thus increasing an insulation distance (creepage distance) between two electric conductors, i.e., the battery cover plate of the battery and the battery housing of the adjacent battery, and enhancing the insulation safety between the adjacent single batteries. Furthermore, how to maintain good mechanical strength and electrical safety of the battery module while reducing the structural members is also a focus of continuous research by various companies. In addition, at least part of the extension portion is accommodated in the groove to prevent the top plate from crushing the insulation film.

Figure 1:
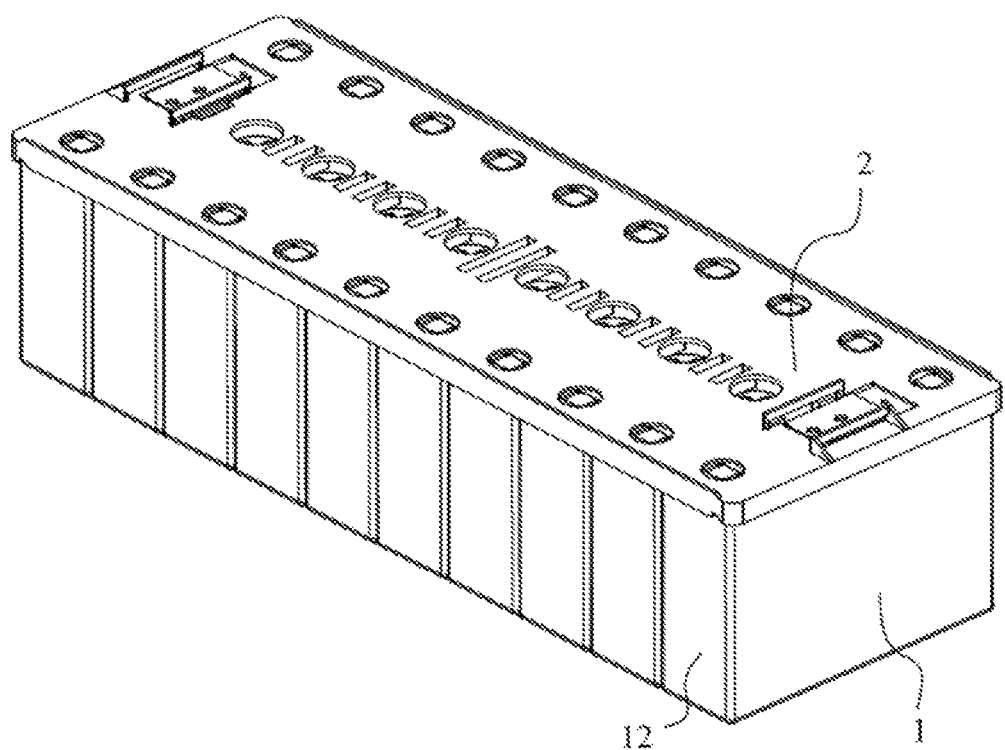
FIG. 1 is a schematic diagram of a battery module according to an embodiment of the present disclosure.

Reference numerals include:

1, battery unit; 11, battery; 111, battery housing; 1111, first large face; 1112, first small face; 1113, second large face; 1114, second small face; 112, battery cover plate; 12, insulation film; 120, extension portion; 121, crease; 122, first back adhesive layer; 123, second back adhesive layer; 1231, back adhesive layer of the first large face; 1232, back adhesive layer of the second large face; 1233, back adhesive layer of the first small face; 1234, back adhesive layer of the second small face; 124, seal; 125, double-film structure;

2, top panel; 21, supporting block; 211, groove; 212, protrusion block;

3, first end plate;

4, second end plate;

5, first elastic component; and 6. second elastic component.

DETAILED DESCRIPTION

To make the technical problems resolved by the present disclosure as well as technical solutions and beneficial effects of the present disclosure clearer, the present disclosure is described in further detail below with reference to the accompanying drawings and embodiments. It should be understood that the specific embodiments described herein are merely used to explain the present disclosure but are not intended to limit the present disclosure.

Figure 2:
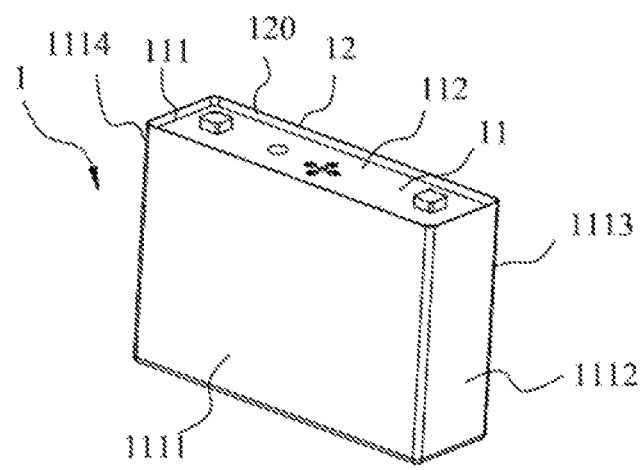
FIG. 2 is a schematic diagram of a battery unit of a battery module according to an embodiment of the present disclosure.
Figure 3:
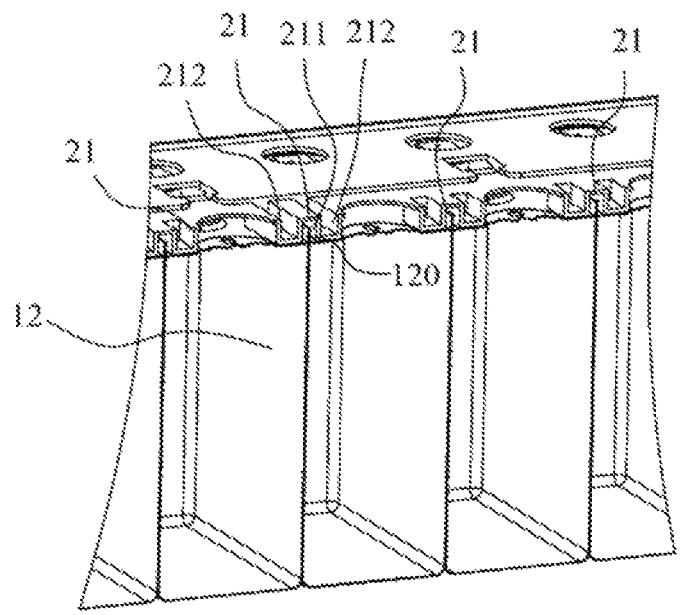
FIG. 3 is a (partial) diagram of fitting between a top plate and an insulation film of a battery module according to an embodiment of the present disclosure.

As shown in FIG. 1 to FIG. 3, an embodiment of the present disclosure provides a battery module, including a plurality of battery units 1 stacked along a preset direction and a top plate 2, where the battery unit 1 includes a battery 11 and an insulation film 12. The battery 11 includes a battery housing 111, a battery core disposed inside the battery housing 111, and a battery cover plate 112 disposed on an end portion of the battery housing 111. The insulation film 12 is coated on a side face and a bottom face of the battery housing 111. The insulation films 12 of every two adjacent battery units 1 are bonded to each other in the preset direction to connect the plurality of battery units 1 together.

As shown in FIG. 2 and FIG. 3, the insulation film 12 includes an extension portion 120. The extension portion 120 is formed by a top portion of the insulation film 12 which protrudes from the battery cover plate 112 and extends upward. A groove 211 is provided at a lower side of the top plate 2, and at least part of the extension portion 120 is accommodated in the groove 211, that is, a part or all of the extension portion 120 is accommodated in the groove 211.

In an embodiment, as shown in FIG. 3, a plurality of supporting blocks 21 is disposed on a bottom portion of the top plate 2, and the groove 211 is formed on the supporting block 21. The supporting block 21 extends from a bottom portion of the top plate 2 towards the battery cover plate 112, and the supporting block 21 is supported on the battery cover plate 112. The supporting block 21 is composed of two protrusion blocks 212 on the left and right, and the groove 211 is formed between the two protrusion blocks 212.

The supporting block 21 is a strip extending along a direction perpendicular to the preset direction (that is, along a width direction of the battery module). The supporting block 21 is mainly to strengthen the top plate 2 and acts as a reinforcement rib, so that no additional reinforcement structure needs to be disposed on the top panel.

As shown in FIG. 2, the battery 11 is a square battery, and the side face of the battery housing 111 includes large faces and small faces. The large faces include a first large face 1111 and a second large face 1113, and the small faces include a first small face 1112 and a second small face 1114. The first large face 1111 and the second large face 1113 are disposed opposite to each other; the first small face 1112 and the second small face 1114 are disposed opposite to each other. The first large face 1111, the first small face 1112, the second large face 1113, and the second small face 1114 are successively connected to form the side face of the battery housing 111, and an area of the large face is greater than an area of the small face.

Figure 4:
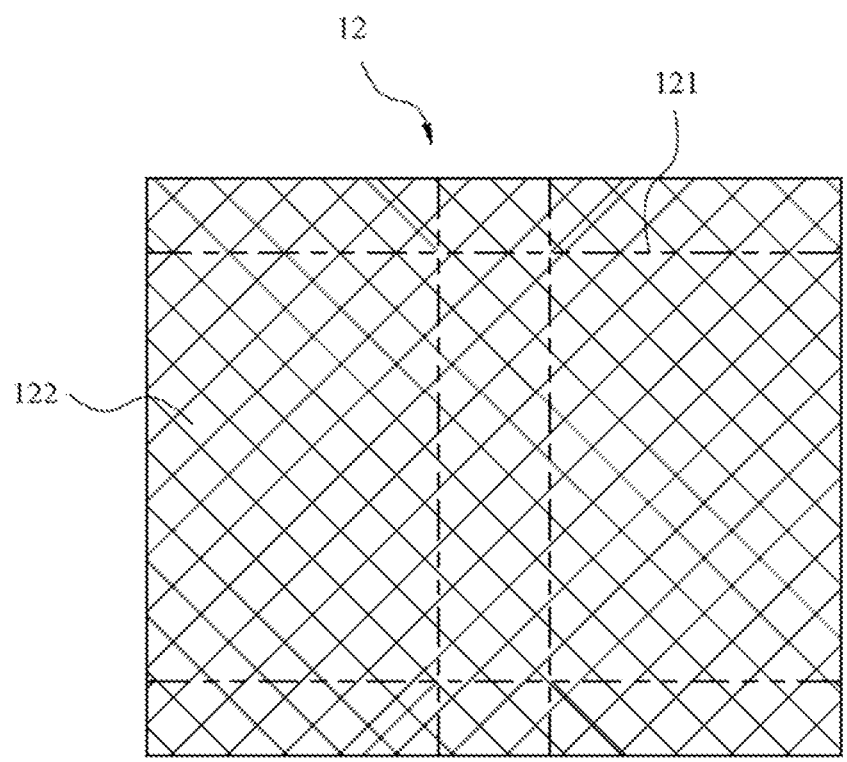
FIG. 4 is a diagram of an unfolded state of an insulation film of a battery module according to an embodiment of the present disclosure.
Figure 5:
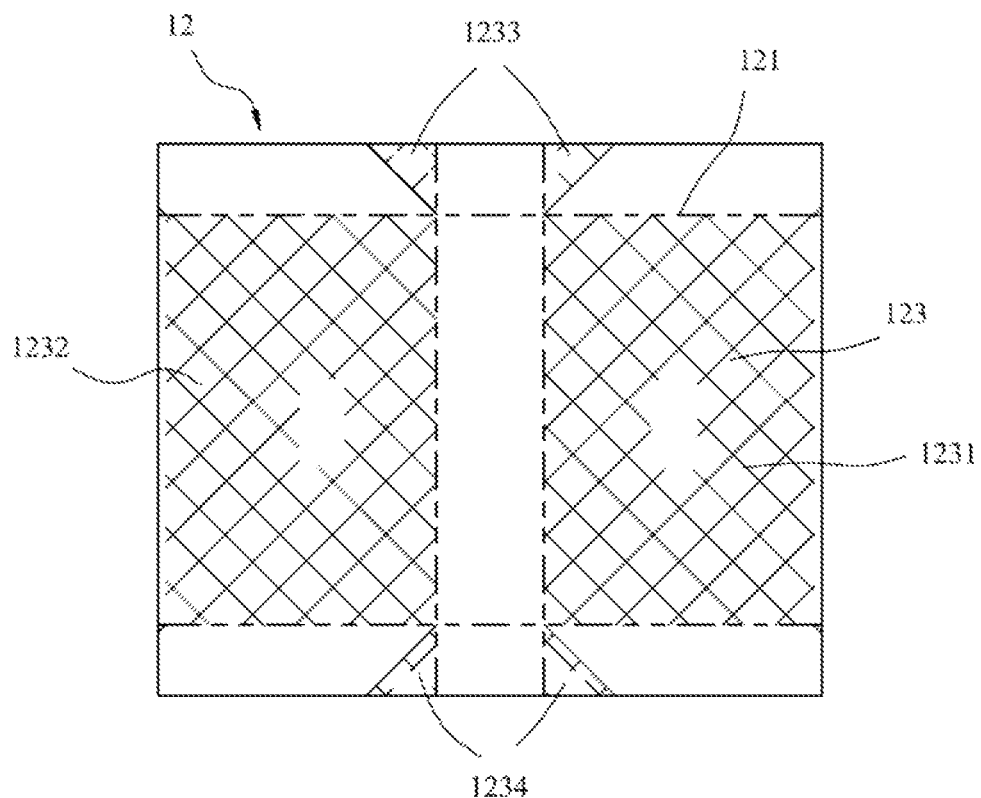
FIG. 5 is a diagram at another angle of view of FIG. 4.

As shown in FIG. 4 and FIG. 5, the insulation film 12 in an unfolded state is square-shaped, a crease 121 is provided on the insulation film 12, and the insulation film 12 in the unfolded state is folded and coated on the side face and the bottom face of the battery housing 111 along the crease 121. The insulation film 12 in the unfolded state is provided with a first surface and a second surface. A first back adhesive layer 122 is disposed on the first surface, and a second back adhesive layer 123 is disposed on the second surface. The first back adhesive layer 122 partially or fully covers the first surface. The second back adhesive layer 123 includes a first large face back adhesive layer 1231 matching the shape of the first large face 1111, a second large face back adhesive layer 1232 matching the shape of the second large face 1113, a first small face back adhesive layer 1233, and a second small face back adhesive layer 1234.

After the battery unit 1 is formed, the first back adhesive layer 122 is disposed between the insulation film 12 and the side face of the battery housing 111, the insulation film 12 is bonded to the side face and the bottom face of the battery housing 111 through the first back adhesive layer 122, that is, the first surface of the insulation film 12 is an inner side face fitting the battery housing 111. In addition, the second back adhesive layer 123 is disposed on an outer side of the insulation film 12 located between two adjacent battery units 1, and the two adjacent battery units 1 are bonded to each other through the second back adhesive layer 123.

It should be noted that, in the solution shown in FIG. 4, the first back adhesive layer 122 fully covers the first surface of the insulation film 12. In actual setup, the first back adhesive layer 122 may partially cover the first surface of the insulation film 12, and when the first back adhesive layer 122 partially covers the first surface of the insulation film 12, solidity of the bonding between the insulation film 12 and the battery housing 111 is ensured.

By disposing the first back adhesive layer 122 and the second back adhesive layer 123, there is no need for disposing an additional adhesive between the single batteries 11, and the process is simple.

Figure 6:
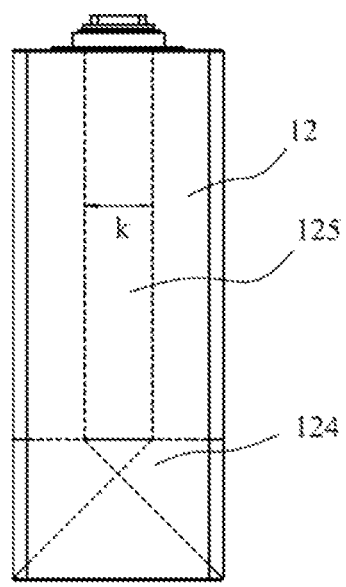
FIG. 6 is a schematic diagram of a seal of an insulation film of a battery module according to an embodiment of the present disclosure.

In an embodiment, as shown in FIG. 6, the seal 124 of the insulation film 12 is located on the first small face 1112 and/or the second small face 1114. A double-film structure 125 is formed at the seal 124 of the insulation film 12. Preferably, a width k of the double-film structure 125 meets the following requirements:

$2x \geq 3k \geq x$, where x is a width of the first small face 1112 or the second small face 1114. That is, the width k of the double-film structure 125 ranges from $\frac{1}{3}$ to $\frac{2}{3}$ of the width of the first small face 1112. In the battery module according to the embodiments of the present disclosure, the structural members that act as connectors in the prior art are removed, the insulation films on two adjacent battery units are bonded to each other in the preset direction to connect the plurality of battery units together, thereby realizing weight reduction of the battery module without decreasing the strength of the battery module. In addition, the extension portion is formed by the top portion of the insulation film which protrudes from the battery cover plate and extends upward, and at least part of the extension portion is accommodated in the groove provided on the lower side of the top panel, thus increasing an insulation distance (creepage distance) between two electric conductors, i.e., the battery cover plate of the battery and the battery housing of the adjacent battery, and enhancing the insulation safety between the adjacent single batteries. Furthermore, how to maintain good mechanical strength and electrical safety of the battery module while reducing the structural members is also a focus of continuous research by various companies. In addition, at least part of the extension portion is accommodated in the groove to prevent the top plate from crushing the insulation film.

Figure 7:
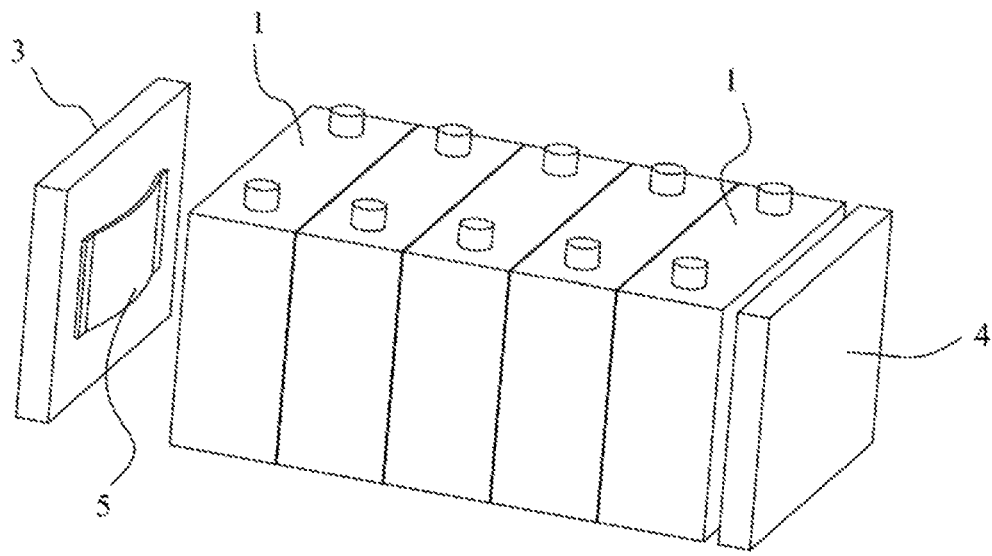
FIG. 7 is an exploded view (three-dimensional view) of a battery module according to another embodiment of the present disclosure.
Figure 8:
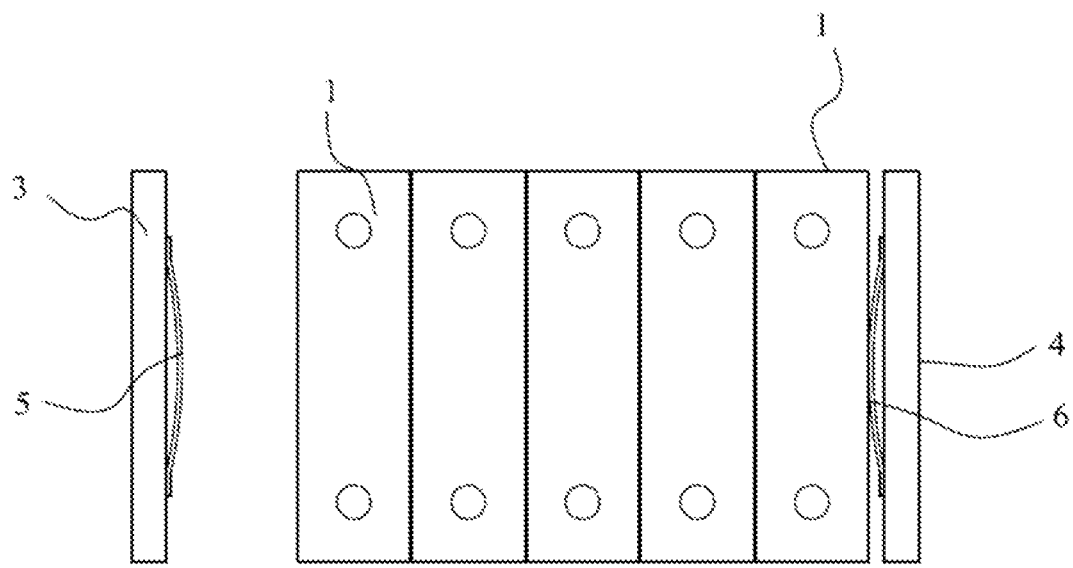
FIG. 8 is an exploded view (top view) of a battery module according to another embodiment of the present disclosure.

In another embodiment, as shown in FIG. 7 and FIG. 8, the battery module further includes a first end plate 3, a second end plate 4, a first elastic component 5, and a second elastic component 6. The first end plate 3 is disposed on a front end of the first battery unit 1 in the preset direction, and the second end plate 4 is disposed on a rear end of the last battery unit 1 in the preset direction. The first elastic component 5 is prepressed between the first end plate 3 and the first battery unit 1, and the second elastic component 6 is prepressed between the second end plate 4 and the last battery unit 1.

The first end plate 3 provides a backward force for the first battery unit 1, and the second end plate 4 provides a forward force for the last battery unit 1, where the forward and backward herein are relative to the preset direction. In this case, the first end plate 3 and the second end plate 4 provide a pressing force for the plurality of battery units 1 composing the battery module, thereby pressing the plurality of battery units 1 together.

During installation, the first end plate 3 and the second end plate 4 are fixed in a position in the battery module, so that the first elastic component 5 and the second elastic component 6 can continuously apply an inward pressure from both ends to the plurality of battery units 1.

In this embodiment, the first elastic component 5 and the second elastic component 6 are metal elastic pieces or springs.

When the battery unit 1 in the battery module is expanded and deformed, a large expansion force is applied to the first end plate 3 and the second end plate 4 at both ends of the battery module due to the large expansion and deformation of the two large faces of the battery unit 1. In this case, the first elastic component 5 and the second elastic component 6 are deformed to absorb and ease the expansion force generated by the battery unit 1, to prevent a deformation of the first end plate 3 and the second end plate end 4 at both ends of the battery module and a failure of an adhesive part (the insulation film 12) along a length direction (the preset direction) of the battery module, thereby enhancing the structural strength of the battery module.

In addition, in a modified embodiment of the embodiment shown in FIG. 7 and FIG. 8, the first battery unit is provided with a first driver plate on a surface facing the first end plate, and the first elastic component is disposed between the first driver plate and the first end plate; the last battery unit is provided with a second driver plate on a surface facing the second end plate, and the second elastic component is disposed between the second driver plate and the second end plate.

Compared with the embodiment shown in FIG. 7 and FIG. 8, in this embodiment, an area of the elastic force applied by the first elastic component on the battery unit is increased through the first driver plate, and an area of the elastic force applied by the second elastic component on the battery unit is increased through the second driver plate, thus avoiding damage and scratch of the battery unit caused by direct contact between the first elastic component and the battery unit and between the second elastic component and the battery unit. In addition, in an embodiment which is not shown in the accompanying drawings, the insulation film is merely coated on the side face of the battery housing. In order to realize the insulation of the bottom face of the battery housing, an insulation baseplate is disposed on the bottom face of the battery housing. Preferably, a lower edge of the insulation film overlaps with an upper edge of the insulation baseplate to ensure the insulation performance of a junction between the insulation film and the insulation baseplate.

In addition, in an embodiment which is not shown in the accompanying drawings, the groove may alternatively be formed between two adjacent supporting blocks.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A battery module, comprising a plurality of battery units stacked along a preset direction and a top plate, wherein each battery unit of the plurality of battery units comprises a battery and an insulation film, the battery comprises a battery housing, a battery core disposed inside the battery housing, and a battery cover plate disposed on an end portion of the battery housing; the insulation film is coated on at least one side face of the battery housing, the insulation film on each battery unit is bonded to the insulation film on an adjacent battery unit in the preset direction to connect the plurality of battery units together; and the insulation film comprises an extension portion, wherein the extension portion is formed by a top portion of the insulation film which protrudes from the battery cover plate and extends upward, the top plate is disposed on an upper side of the battery unit, a groove is provided on a lower side of the top plate, and at least part of the extension portion is accommodated in the groove.

2. The battery module according to claim 1, wherein a plurality of supporting blocks is disposed on a bottom portion of the top plate.

3. The battery module according to claim 2, wherein the groove is formed on the supporting block, or the groove is formed between two adjacent supporting blocks.

4. The battery module according to claim 2, wherein the supporting block extends from the bottom portion of the top plate towards the battery cover plate, and the supporting block is supported on the battery cover plate.

5. The battery module according to claim 1, wherein the insulation film is coated on the side face of the battery housing, and an insulation baseplate is disposed on a bottom face of the battery housing.

6. The battery module according to claim 5, wherein a lower edge of the insulation film overlaps with an upper edge of the insulation baseplate.

7. The battery module according to claim 1, wherein the side face of the battery housing comprises large faces and small faces; the large faces comprise a first large face and a second large face; the small faces comprise a first small face and a second small face; the first large face, the first small face, the second large face, and the second small face are successively connected to form the side face of the battery housing; an area of the large face is greater than an area of the small face; the first large face and the second large face are disposed opposite to each other, and the first small face and the second small face are disposed opposite to each other.

8. The battery module according to claim 1, wherein the insulation film is provided with a first back adhesive layer on a side face fitting the battery housing, and the insulation film is bonded to the side face of the battery housing through the first back adhesive layer.

9. The battery module according to claim 1, wherein a second back adhesive layer is disposed on an outer side of the insulation film located between two adjacent battery units, and the two battery units are bonded to each other through the second back adhesive layer.

10. The battery module according to claim 7, wherein a seal of the insulation film is located on the first small face or the second small face.

11. The battery module according to claim 10, wherein a double-film structure is formed on the seal of the insulation film.

12. The battery module according to claim 11, wherein a width k of the double-film structure meets the following requirements:
$2x \geq 3k \geq x$, wherein
x is a width of the first small face or the second small face.

13. The battery module according to claim 1, wherein the battery module further comprises a first end plate, a second end plate, a first elastic component, and a second elastic component; the first end plate is disposed on a front end of the first battery unit in the preset direction, the second end plate is disposed on a rear end of the last battery unit in the preset direction, the first elastic component is prepressed between the first end plate and the first battery unit, and the second elastic component is prepressed between the second end plate and the last battery unit.

14. The battery module according to claim 13, wherein the first battery unit is provided with a first driver plate on a surface facing the first end plate, and the first elastic component is disposed between the first driver plate and the first end plate; the last battery unit is provided with a second driver plate on a surface facing the second end plate, and the second elastic component is disposed between the second driver plate and the second end plate.

15. The battery module according to claim 13, wherein the first elastic component and the second elastic component are metal elastic pieces or springs.

16. The battery module according to claim 7, wherein a seal of the insulation film is located on the first small face and the second small face.

17. The battery module according to claim 16, wherein a double-film structure is formed on the seal of the insulation film.

18. The battery module according to claim 17, wherein a width k of the double-film structure meets the following requirements:
$2x \geq 3k \geq x$, wherein
x is a width of the first small face or the second small face.

19. The battery module according to claim 12, wherein the battery module further comprises a first end plate, a second end plate, a first elastic component, and a second elastic component; the first end plate is disposed on a front end of the first battery unit in the preset direction, the second end plate is disposed on a rear end of the last battery unit in the preset direction, the first elastic component is prepressed between the first end plate and the first battery unit, and the second elastic component is prepressed between the second end plate and the last battery unit.

20. The battery module according to claim 19, wherein the first battery unit is provided with a first driver plate on a surface facing the first end plate, and the first elastic component is disposed between the first driver plate and the first end plate; the last battery unit is provided with a second driver plate on a surface facing the second end plate, and the second elastic component is disposed between the second driver plate and the second end plate.

* * * * *